Sept. 6, 1955            H. J. DIXON ET AL          2,717,301
DEVICE FOR SOLDERING PIN, SOCKET AND THE
LIKE TO THE END OF WIRE AND THE LIKE
Filed May 18, 1953                                              4 Sheets-Sheet 1

Inventor
H.J. Dixon
J.E.G. Chapman
By F.A. Harwood
Webb Mackey & Burden
Attorney

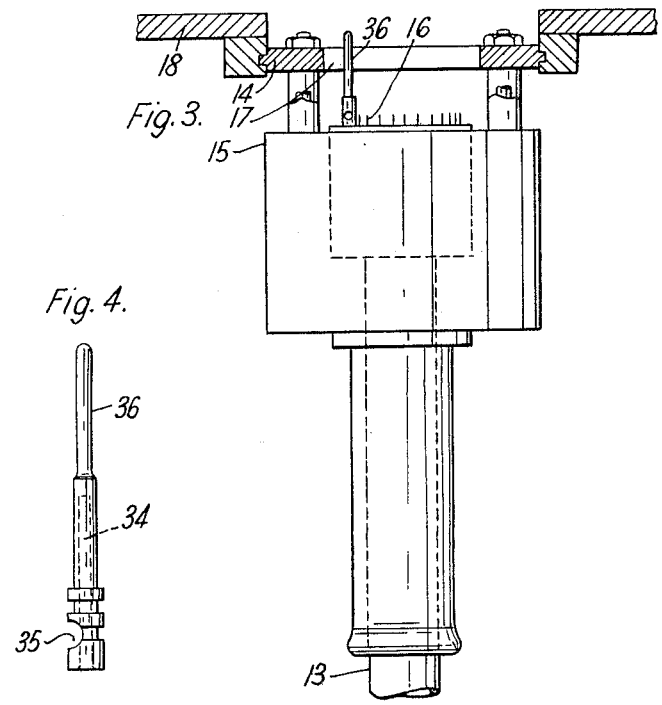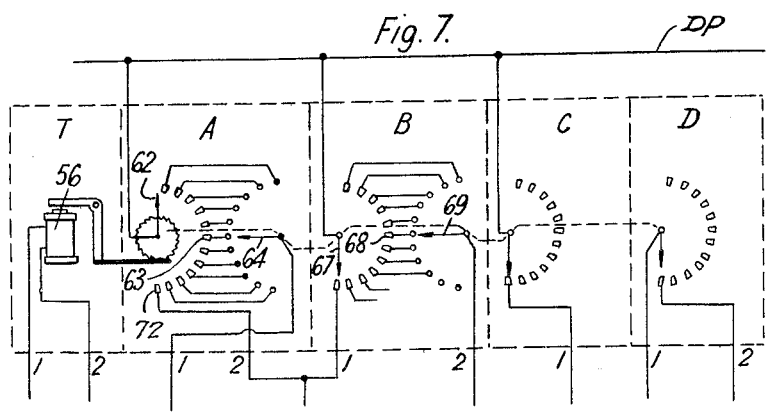

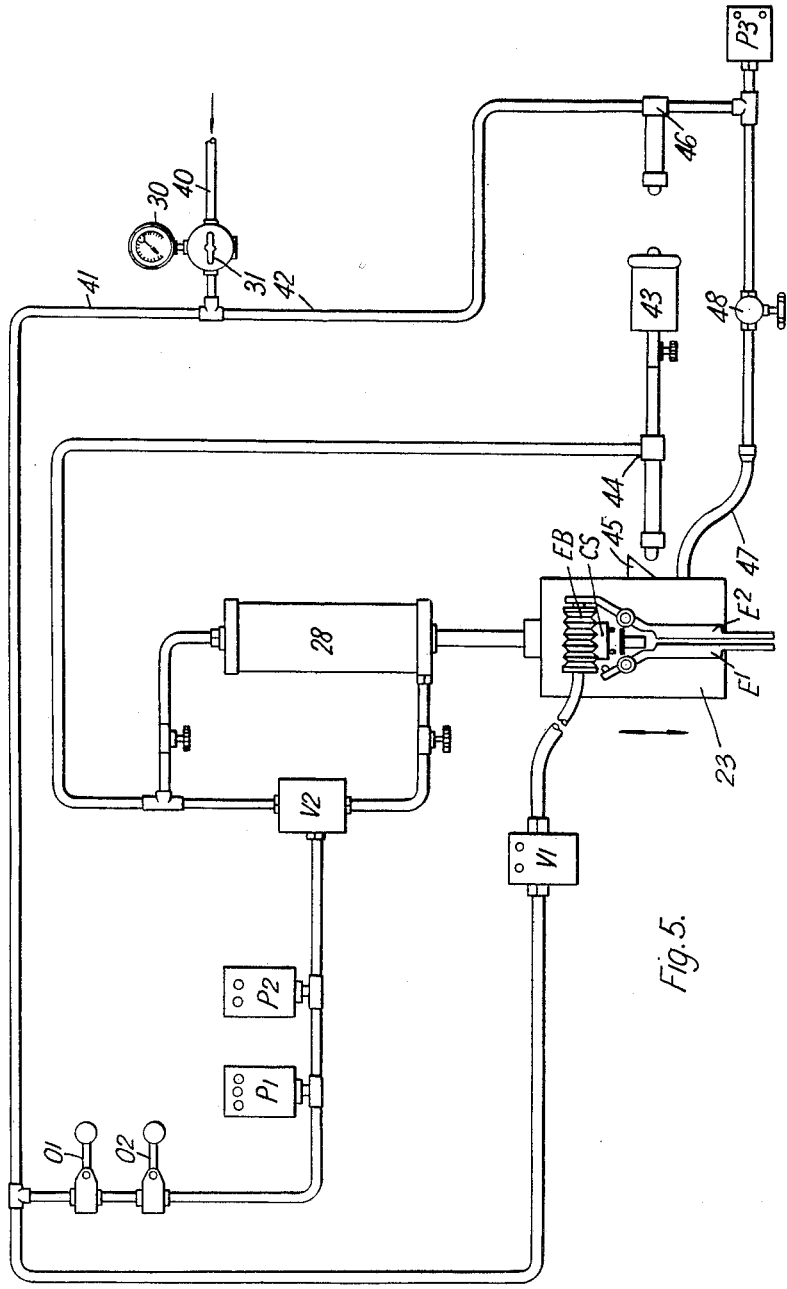

Sept. 6, 1955  H. J. DIXON ET AL  2,717,301
DEVICE FOR SOLDERING PIN, SOCKET AND THE
LIKE TO THE END OF WIRE AND THE LIKE
Filed May 18, 1953  4 Sheets-Sheet 4
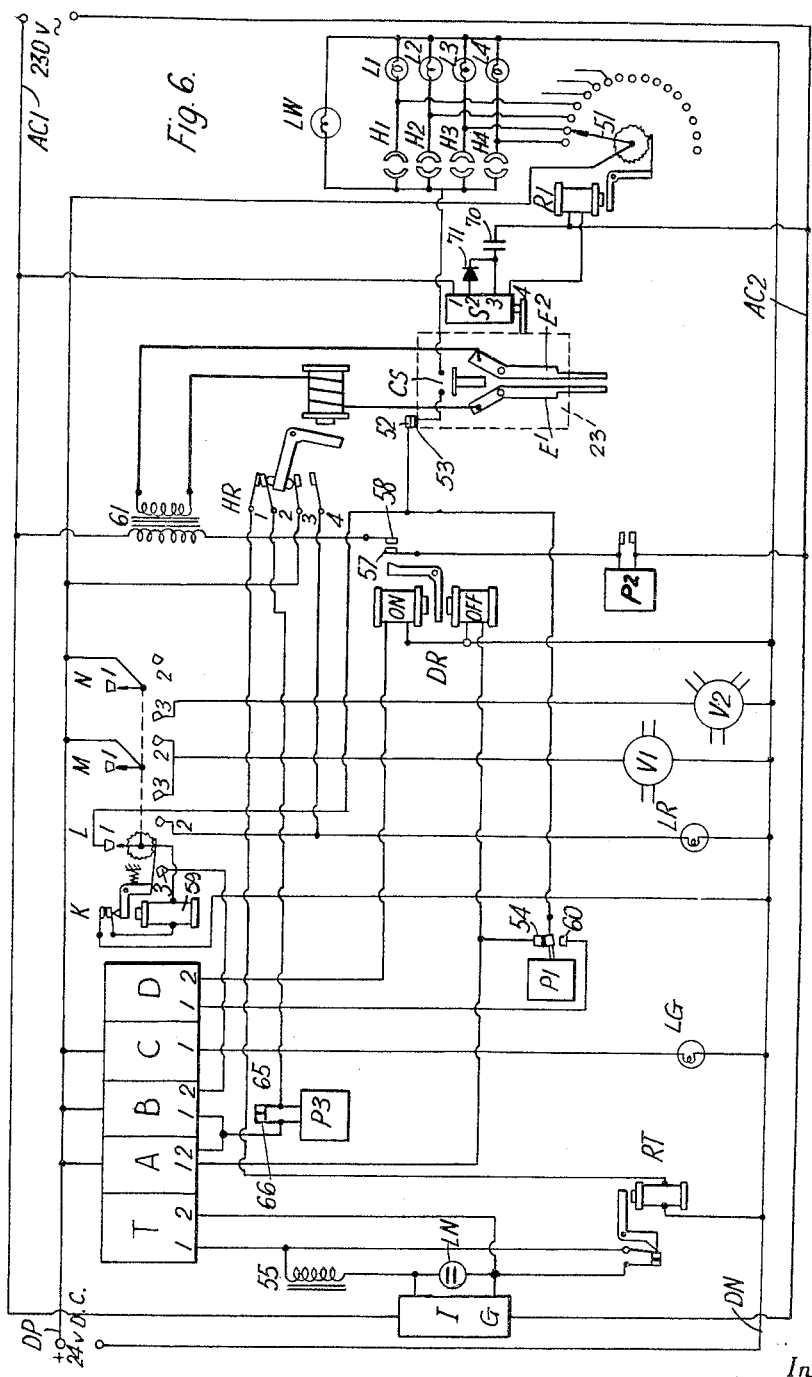
Inventor
H. J. Dixon
J. E. G. Chapman
F. A. Harwood
By
Webb Mackey & Burden
Attorney

United States Patent Office 2,717,301
Patented Sept. 6, 1955

2,717,301

DEVICE FOR SOLDERING PIN, SOCKET AND THE LIKE TO THE END OF WIRE AND THE LIKE

Henry Johnson Dixon, West Kirby, Joseph Edward Geoffrey Chapman, Workington, and Frederick Arthur Harwood, Maghull, near Liverpool, England, assignors to British Insulated Callender's Cables Limited, London, England, a British company Application May 18, 1953, Serial No. 355,674

Claims priority, application Great Britain May 20, 1952

10 Claims. (Cl. 219—12)

This invention is concerned with the attachment by soldering to the end of a wire of some terminal piece, such, for instance, as a pin or a socket forming part of a coupling. The attachment is made by the insertion of the end of a wire into a hole or recess in the terminal member, a suitable amount of solder being interposed between the two, as for instance by insertion in the socket or recess in advance of the wire or by attachment to the wire. It is to be understood that the wire may be replaced by some other body having a relatively thin projecting piece. The term "wire" will hereinafter be used for convenience in referring to one of the pieces to be joined and the term "pin" for the other piece.

In accordance with the invention the soldering operation is effected by a device or machine carrying out a cycle of operations automatically. In this apparatus there is a support for the wire and a carriage for the pin which is moved towards and away from the wire as the cycle of operations proceeds. For convenience of description, movement of the pin towards the wire will be described as "downward" and the reverse movement as "upward."

In accordance with the invention the pin, as it is inserted in the carriage, is automatically gripped thereby. This operation or the manual operation of a valve or switch causes the carriage to start in slow movement towards the wire and the application of heat to the pin for a controlled time during the downward movement of the carriage. Preferably the movement of the carriage cannot take place until the pin has been fully inserted. By this movement the ends of the wire and pin are brought into the relative positions for soldering and the heat applied to the pin melts the solder. When the carriage arrives at the end of the stroke, cooling air is allowed to play for a controlled time upon the pin to freeze the solder. At the end of this time the pin is released by the carriage which makes its return stroke and resets the apparatus for a new cycle.

It is preferred to use an electropneumatic system of control. In this system the movement of the carriage for the pin can be brought about by a piston working in an air cylinder with electrically controlled valves. Under similar control compressed air can be supplied for cooling.

It is preferred to use electric heating for the pin and this can conveniently be done by passing a current through the pin between two electrodes which serve also to hold the pin in position on the carriage. These electrodes may be normally spaced apart so that the pin can be freely inserted between them and they can be arranged to be moved to grip the pin when the end of the latter is pressed into engagement with a switch at the completion of its insertion between the electrodes. A separate hand switch or this switch may initiate the downward movement of the carriage and the commencement of this movement may be caused to actuate a second switch which starts a process timer by which the duration of the heating period is determined. On arrival at the lower end of its stroke the carriage may actuate a third switch by which the supply of cooling air is controlled for a period determined by the same or a second process timer which at the end of the period causes the release of the pin and the commencement of the upward movement of the carriage. On reaching the upper end of its stroke the carriage can operate a switch to reset the initial conditions.

The invention is particularly applicable to cases where a number of soldering operations have to be performed in sequence on differently spaced wires. These may, for instance be a set of wires projecting parallel with each other from the end of a cable or from part of a coupling attached to a cable. For the purpose of making connection in sequence the support of the wires must be moved between each soldering operation so as to bring a new wire into position to receive the pin when it is lowered on to it. This can be done by the use of an index plate having a pattern of holes similar to the pattern of the arrangement of the wires and co-operating with an index pin attached to the support for the group of wires so that when the pin is in each one of the holes a wire is correctly positioned. The hole to which the index pin is to be moved for the next soldering operation can be indicated, as, for instance, by the lighting of a lamp. It will not generally be convenient to arrange the lamps on the index plate since this will usually not be large enough to receive them. They can, however, be shown on an adjacent plate in a pattern similar to the holes on the index plate but on an enlarged scale.

In cases where the disposition of the wires is in a simple pattern, such as in even spacing round a circle, and the member carrying the wires is of sufficient mobility, indexing between movements may be made entirely automatic, as for instance by rotation of the support for the wires through appropriate angular distances about a vertical axis.

A machine in accordance with the invention, for soldering terminal pins to the conductor wires of a multi-core cable, will hereinafter be described as an example with reference to the accompanying drawings in which Figure 1 is a front elevation;

Figure 3 is an elevation partly in cross-section showing the method of clamping the cable end to the machine;

Figure 4 is an elevation of one of the pins to be attached to the conductor wires;

Figure 5 is a diagram of the pneumatic circuit of the machine;

Figure 6 is a diagram of the electric circuit machine; and

Figure 7 is an electrical diagram of a process timer used in the machine.

Figure 1:
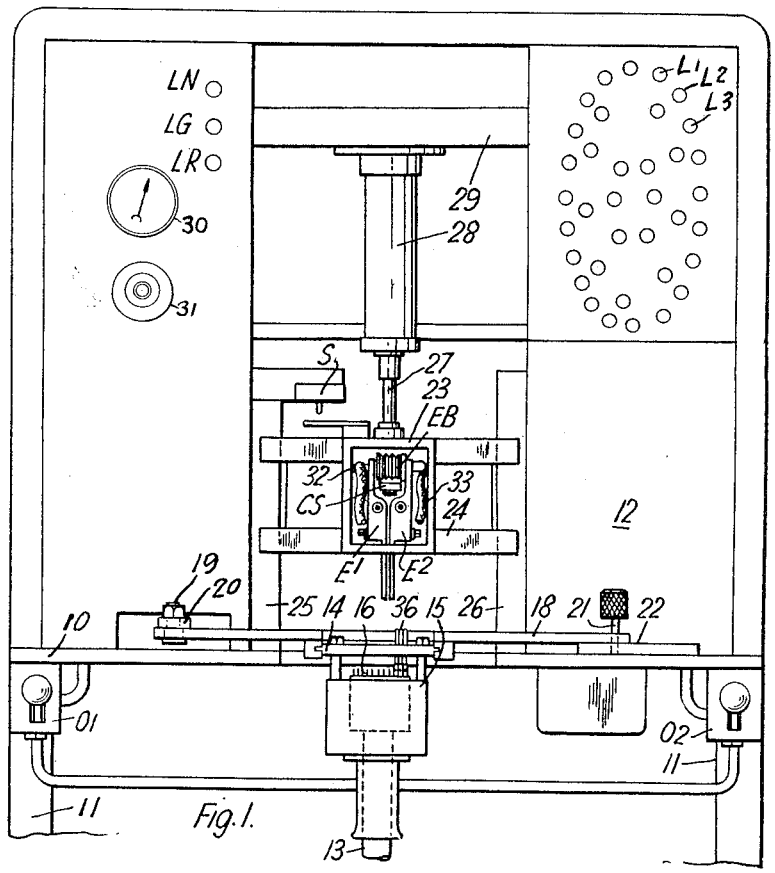
Figure 2:
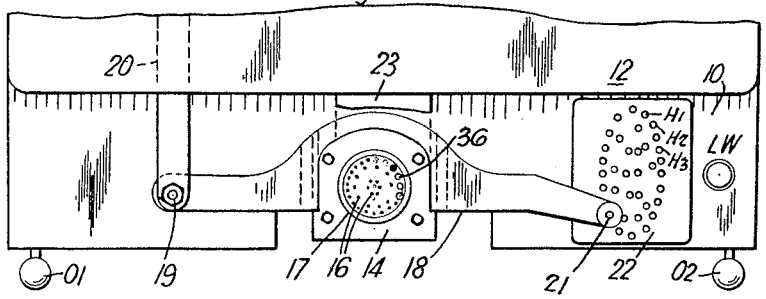
Figure 2 is a plan of part of the machine.

Referring to Figures 1, 2 and 3, the machine has a worktable 10 mounted on legs 11 and above and behind the table 10 there is an enclosure 12 for the electric and pneumatic apparatus. An electric cable 13 is brought up from beneath the table 10 and its end is supported beneath a small plat-form 14 carrying a clamp 15 for the end of the cable. (This part of the apparatus is shown enlarged and in more detail in Figure 3.) Access can be had to the conductor wires 16 of the cable through a circular aperture 17 in the platform 14.

Referring again to Figures 1 and 2 the platform 14 is carried by a support 18 freely pivoted by a nut and bolt 19 to a pivoted arm 20. The position of the end of the cable 13 with respect to the table 10 can be adjusted by lifting a pin 21, secured to and passing through the end of the pivoted support 18, and inserting it in one of the holes H1, H2, H3, etc., in an index plate 22 mounted on the table 10. Above the end of the cable is mounted a vertically reciprocating carriage 23 rigidly secured to two cross-pieces 24 having slotted ends sliding on fixed vertical guides 25 and 26. The carriage is attached to the piston rod 27 of a double-acting pneumatic cylinder 28 secured to a cross-piece 29 in the framework of the machine.

On the left-hand panel of the machine there is a pressure gauge 30, a pressure control valve 31, a neon lamp LN, a green filament lamp LG and a red filament lamp LR. On the right-hand front panel of the machine are indicating lamps L1, L2, L3 etc., arranged in a pattern corresponding to the pattern of the holes H1, H2, H3 etc., in the index plate 22. On the table 10 there is a white indicating lamp LW and beneath the table two hand-operated pneumatic valves O1 and O2.

The carriage 23 consists of a closed box with an airtight front cover, which in Figure 1 is removed. Inside this box are two pivoted metal electrodes E1 and E2, the lower parts of which can be forced together by admitting air under pressure into the bellows EB through a flexible pipe which passes into the back of the carriage 23. Also passing into the carriage 23 from behind are flexible electric cables 32, 33. Mounted beneath the bellows EB is an electric switch CS. A projecting arm on the carriage 23 operates an electric switch S carried on the frame of the machine when the carriage is in its highest position.

Figure 4 is an elevation of a pin of the kind which can be soldered to cable conductors by the machine being described. The pin is of solid metal with an axial bore 34 extending through about half its length, the bore being accessible from the side of the pin at the lower end through a groove 35 in the side wall. (In the remaining figures of the drawings the pins are indicated by the reference numeral 36 and the conductor ends to which they are attached by the reference numeral 16.) The adjacent faces of the electrodes E1 and E2 are formed with vertical grooves to receive a pin of the kind shown in Figure 4. Before use the bore of the pin is partly filled with solder through the side groove 35 and the solder allowed to set. There is a hole in the lower wall of the carriage 23 through which electrodes project. The pins 36 fit between the pivoted electrodes E1, E2. When a pin is fully inserted between the electrodes its upper end makes contact with and operates the switch CS in the carriage.

Referring now to Figure 5 which shows the pneumatic circuit of the apparatus the double-acting pneumatic cylinder 28 can be seen in the middle of this figure and the carriage 23, with electrodes E1 and E2, bellows EB and switch CS are all diagrammatically represented. Compressed air is fed to the system through a supply pipe 40, control valve 31 and pressure gauge 30 to two branch pipes 41 and 42 of the system. The pipe 41 feeds the bellows EB through a single-way electrically operated pneumatic valve V1 and the cylinder 28 through a two-way electrically operated valve V2, the supply of air to V2 being controlled by the hand operated valves O1 and O2, which can be seen also in Figure 1. Connected to the pipe which feeds the two-way valve V2 are two pneumatically operated electric switches P1 and P2, P1 being a change-over switch and P2 a single-break switch. From the valve V2 are pipes leading to the upper and lower ends respectively of the double-acting pneumatic cylinder 28. The valve V2 normally connects the lower part of the cylinder 28 to the pressure supply and opens the upper part to the atmosphere. When electrically actuated it connects the upper part of the cylinder to the pressure supply and opens the lower part to the atmosphere.

The pipe feeding the upper part of the cylinder also feeds a slow-acting piston 43 through a mechanically operated valve 44, the valve 44 being actuated by a projection 45 on the carriage 23 when the carriage is in its lowest position. When the valve 44 is open and supplied with air under pressure the piston 43 moves slowly to the right until it operates a mechanical valve 46 which opens and allows compressed air to flow from the branch pipe 42 through a flexible pipe 47 into the carriage 23. The opening of the valve 46 also supplies air to a pneumatically operated single break electric switch P3. A valve 48 in the pipe to the carriage 23 is adjusted to ensure that the air supply to the valve P3 is at a high enough pressure to actuate it.

Referring now to Figure 6 many of the parts already described can be seen; they are given the same reference numerals and letters as in the remaining figures. The carriage 23 is again shown diagrammatically, as are also the electrodes E1 and E2 and the carriage switch CS. In addition the following important pieces of apparatus are seen in Figure 6. Immediately to the right of the carriage 23 is a four terminal switch S which controls the apparatus to the right of it including a 36 position uniselector switch actuated by an electromagnet RI and forming the principal part of the indexing apparatus. Above the carriage on the diagram is a heavy current relay HR and to the left of the carriage a double acting relay DR. At the top left hand corner of the diagram is a process timer marked TABCD (shown in more detail in Figure 7) and a three position uni-selector switch K having three mechanically connected banks L, M and N. The banks M and N control the valves V1 and V2. Above the heavy current relay HR is a transformer 61 supplying power through the coil of HR to the electrodes E1 and E2.

The process timer operates as follows. An impulse generator G (Figure 6) is connected across the leads AC1 and AC2, this generates impulses at fixed intervals, for example a convenient interval in the apparatus being described is ½ second but this can be adjusted to any suitable period. The feeding of these impulses to the four-bank selector switch T is controlled by a relay RT which is normally closed (as shown). When the relay RT is closed the impulses are absorbed in a reactor 55 and do not affect the four-bank selector switch T but when the coil of the relay RT is energised to open its contacts the impulses are fed to the operating coil 56 (Figure 7) and each impulse moves all four banks A, B, C and D through one position. There are twenty-four positions but only twelve positions are used in the banks A and B and only one position is used in each of the banks C and D. The fact that the impulse generator is switched on but not operating the four bank selector switch is indicated by the flashing of the neon lamp LN. The relay RT is energized from the D. C. main through contacts 1 and 2 of the heavy current relay, the contacts 65 and 66 of the pressure switch P3 and certain contacts of either of the banks A and B. For example when the uni-selector is in the position shown in the drawings D. C. main DP is connected through the moving contact 67 of bank B to contact 66 of pressure switch P3. If the uni-selector switch is now started by opening P3 or contacts 1 and 2 of HR it will rotate through 180°, and provided that P3 and contacts 1 and 2 of HR close again will stop when moving contact 62 of bank A reaches contact 72. Thus the uni-selector switch will normally be at rest in one of these two positions and will be started by opening of P3 or contacts 1 and 2 of HR. It will stop automatically when it reaches one of the two positions mentioned above provided that P3 and the contacts 1 and 2 of HR are closed.

The apparatus is supplied with power at 230 volts A. C. through the leads AC1 and AC2 and at 24 volts D. C. through the leads DP and DN. The lead DP is connected to the moving contact 51 of the indexing uniselector switch actuated by the electromagnet RI. This switch has 36 fixed contacts, one associated with each conductor 16 of the cable 13. Each fixed contact is connected through one of the 36 lamps L1, L2, L3 to the D. C. lead DN and also to split sockets each mounted beneath one of the holes H1, H2, H3 in the index plate 22. The sockets are given the same references as the holes with which they correspond. The two halves of each of the split sockets are insulated from each other and the halves of the socket opposite to those connected to one of the lamps L1, L2, L3 etc., are connected together and to one of the fixed contacts of the switch CS mounted on the carriage 23. The other fixed contact of the switch CS is connected to the moving contact of the pressure switch P1 and to a contact L1 of the three-bank uni-selector switch K. The connection between the switch CS, the contact L1 and the pressure switch P1 is broken, when the carriage 23 moves downwards, by separation of the two contacts 52, 53. Contact 53 is mounted on the back of the carriage and contact 52 is mounted on the frame of the machine. The moving contact of the pressure switch P1 is normally in the position shown in Figure 6, that is making contact with a fixed contact 54. The contact 54 is connected to the "off coil" of the double-acting relay DR and to terminal A1 of the four-bank selector switch T.

The cycle of operations performed by the machine is started by pushing a pin upwards between the electrodes E1 and E2 and into a position in which it closes switch CS. If the indexing pin 21 on the support 18 for the cable end is in the correct hole of the index plate 22, that is the one whose socket is connected to the moving contact 51, power is supplied from lead DP through the switch CS and contacts 52, 53 to contact L1 of the three-bank selector switch K and through the moving contact of pressure switch P1 to contact 54 thus energising the off coil of the double acting relay DR. The contacts of DR (57, 58) are opened, if they are not already open, thus preventing supply of A. C. to the transformer 61. The supply of power to contact L1 through the switch CS energises the operating coil 59 of the three-bank selector switch K, moving all banks of the switch from position 1 to position 2. The movement of the moving contact of the first bank L breaks the power supply from switch CS to the operating coil 59. The moving contact of the second bank M moving into the position 2 actuates the electropneumatic valve V1 thus supplying air under pressure to bellows EB and actuating the electrodes E1, E2 to clamp the pin between them. The lighting of lamp LW indicates to the operator that the pin inserted between the electrodes E1 and E2 has in fact closed the switch CS.

The operator then opens the two air valves O1 and O2, one with each hand, and holds these valves open while the machine performs a cycle of operations. By the opening of the valves air is admitted to pressure switches P1 and P2 causing pressure switch P2 to close and the moving contact of pressure switch P1 to make contact with its second (lower) contact 60, hence power is supplied through bank D of the process timer (which is still in the position shown in Figure 7) to the "on" coil of the change-over switch DR closing its contacts 57 and 58. Since pressure switch P2 is also closed power is now supplied to the primary of the transformer 61 from the leads AC1 and AC2.

The secondary of the transformer 61 is connected to the two electrodes E1 and E2 and, provided the pin makes good electrical contact with the two electrodes, current will flow to heat the pin. As soon as the flow of current commences the coil of the heavy current relay HR is energised, contacts HR1 and HR2 (normally closed as shown) are opened and contacts HR3 and HR4 (normally open as shown) are closed. The opening of the contacts 1 and 2 breaks the power supply to the coil of relay RT and starts the four-bank uni-selector switch T of the process timer. Once started the selector switch T moves from the position shown in Figure 7 clockwise each step being caused by one impulse from the impulse generator G.

When contacts HR3 and HR4 are closed power is supplied to the moving contact of the bank L of the three-bank selector switch, thus energising the coil 59 and moving all three banks of the switch to position 3. LR lights and indicates to the operator that heating current is flowing. In this position the moving contact of bank M maintains the power supply circuit to V1, so that the electrodes E1 and E2 continue to grip the pin, and the moving contact of the bank N supplies power through the fixed contact 3 of this bank to the double-acting pneumatic valve V2. The normal position of this valve is the one in which the air supply main is connected to the lower part of the cylinder 28 and the upper part of the cylinder is open to atmosphere. When the valve is energised its position is changed to one in which air under pressure is supplied to the top part of the cylinder and the lower part is opened to atmosphere thus causing the carriage to begin to move downwards towards the cable end. During this movement the four-bank selector switch T is moving clockwise from the position shown in Figure 7 step by step at half-second intervals. When the moving contact 62 of bank A reaches the position marked 63 power is supplied from the main lead DP through an adjustable switch 64 and terminal A1 to the off coil of the change-over switch DR. This opens the contacts 57 and 58 and cuts off the power supply to the transformer 61 thus switching off the heating current and de-energizing the coil of the heavy current relay HR. HR 1 and 2 will close and, since P3 is still closed, when the uni-selector switch T reaches the position in which moving contact 62 of bank A is on fixed contact 72 it will stop.

When the carriage 23 reaches the end of its stroke the projection 45 (shown in Figure 5) operates the air valve 44 and commences the movement to the right of the slow-acting piston 43. After an interval of about one second the piston 43 operates the valve 46 and admits air under pressure to the inside of the carriage 23 and to the pressure switch P3. The only air outlet from the carriage 23 is through the hole through which the electrodes project, escape of air from this hole round the pin cools it. The two contacts 65 and 66 of pressure switch P3 (Figure 6), which are normally closed, now open and relay RT starts the uni-selector switch T and it again commences to move round in a clockwise direction.

When the moving contact 67 of the bank B of the uni-selector switch T passes the position indicated by the reference 68, power is supplied through contact 69, the terminal B2 and the contact L3 to the electromagnet 59 of the three-bank uni-selector switch, causing this switch to move from position 3 to position 1. This cuts off power from the valves V1 and V2 causing V1 to cut off air pressure to the bellows EB and open them to the atmosphere and causing valve V2 to connect the lower part of the cylinder 28 to the air pressure supply and to open the upper part of the cylinder to the atmosphere. Thus the electrodes E1 and E2 open to release the pin and the carriage commences its upward movement. The cooling air is cut off by opening of the valve 44 as the carriage moves upwards followed by movement of the piston 43 to the left and the consequent closing of the valve 46.

Whilst the carriage moves upwards the four-bank uni-selector switch T continues its movement until it reaches the position shown in Figure 7 where it automatically stops itself, P3 and the upper two contacts of HR both being closed. In this position the lamp LG is lighted by bank C showing that the machine is in its correct position for the commencement of a new operation. Bank D of the four-bank uni-selector switch makes the circuit from contact 60 of pressure switch P1 to the "on" coil of the change-over switch DR but no power is supplied to the "on" coil since the switch CS is now open.

When the carriage reaches its uppermost position the indexing apparatus functions under the control of the switch S. This switch has four contacts, of which the upper contacts 1 and 2 are separated and the lower contacts 3 and 4 are in contact when the carriage is in its uppermost position. Contacts 1 and 2 connect a capacitor 70 across the A. C. power supply through a rectifier 71 thus charging the capacitor when the carriage is away from its uppermost position. When the carriage returns to its uppermost position contacts 1 and 2 are separated and contacts 3 and 4 are closed to connect the capacitor 70 across the coil RI of the indexing relay and cause the moving contact 51 to move clockwise through one position. The power circuit to that one of the lamps L1, L2, L3 etc., which is lighted is broken and the circuit to the next lamp made. The lamps are so coupled to the indexing plate sockets H1, H2 etc., that when the indexing pin 21 on the support 18 for the cable end is inserted in the socket connected to, and corresponding in position to, the lamp lighted, that conductor of the cable also corresponding in position to the position indicated by the lighted lamp is directly under the centre of the carriage 23. Thus the cable is in the correct position for a conductor to be fitted with a terminal pin.

The pattern formed by the holes H1, H2 etc., is a distorted reproduction of the pattern of the conductors in the cable, but since the machine operator is only concerned with the matching of the indexing pin with the lamps K1, K2 etc., this distortion does not affect the working of the machine. The indexing apparatus functions to prevent movement of the carriage until the indexing pin 21 has been inserted into the correct hole and also shows the operator which hole is correct. Where the pattern is more simple than that shown, the indexing means could be mechanical, e. g. it could be a pointer coupled to the contact 51 of the indexing switch.

It will be seen that, in the machine described, provided that a pin is correctly inserted between the electrodes E1 and E2 and that the pin makes good electrical contact with the electrodes, the operation of the valves O1 and O2 will cause the machine to commence the cycle of operations necessary to solder the pin to a conductor wire and this cycle will be completed automatically if the valves O1 and O2 are held open.

The periods in which the heating current for the pin and the cooling current of air for the pin are switched on can be adjusted by moving the contacts 64 and 69 in banks A and B of the process timer. Also the frequency at which impulses are generated by the impulse generator G can be adjusted.

What we claim as our invention is:

1. A machine for automatically carrying out a cycle of operations involved in the soldering of a terminal piece to a conductor comprising a support for the conductor, a movable carriage carrying means for gripping the terminal piece, means for actuating the gripping means for the terminal piece upon insertion of a terminal piece, means for moving the carriage to carry the terminal piece towards the conductor into a position for attachment to the conductor, means for heating the terminal piece, means for blowing cooling air on to the terminal piece while it is held in contact with the conductor, means for automatically releasing the terminal piece after an interval for cooling, means for automatically returning the carriage to its original position on completion of the cooling interval and automatic means for resetting the machine for a further cycle of operations.

2. A machine for automatically carrying out a cycle of operations involved in the soldering of a terminal piece to a conductor comprising a support for the conductor, a movable carriage carrying means for gripping the terminal piece, means for actuating the gripping means for the terminal piece upon insertion of a terminal piece, means for moving the carriage to carry the terminal piece towards the conductor into a position for attachment to the conductor which can function only after a terminal piece has been inserted, means for heating the terminal piece, means for blowing cooling air onto the terminal piece while it is held in contact with the conductor, means for automatically releasing the terminal piece after an interval for cooling, means for automatically returning the carriage to its original position on completion of the cooling interval and automatic means for resetting the machine for a further cycle of operations.

3. A machine for automatically carrying out a cycle of operations involved in the soldering of a terminal piece to a conductor comprising a support for the conductor, a movable carriage carrying electrodes for gripping the terminal piece, means for moving the electrodes together to grip the terminal piece upon insertion of a terminal piece between them, means for moving the carriage to carry the terminal piece toward the conductor into a position for attachment to the conductor, means for passing an electric current through the terminal piece via the electrodes to heat the terminal piece, means for blowing cooling air onto the terminal piece while it is held in contact with the conductor, means for automatically releasing the terminal piece after an interval for cooling, means for automatically returning the carriage to its original position on completion of the cooling interval and automatic means for resetting the machine for a further cycle of operations.

4. A machine for automatically carrying out a cycle of operations involved in the soldering of a terminal piece to a conductor comprising a support for the conductor, a movable carriage carrying electrodes for gripping the terminal piece, means for moving the electrodes together to grip the terminal piece upon insertion of a terminal piece between them, means for moving the carriage to carry the terminal piece towards the conductor into a position for attachment to the conductor which cannot function unless good electric contact is made between the electrodes and the terminal piece, means for passing an electric current through the terminal piece via the electrodes to heat the terminal piece, means for blowing cooling air onto the terminal piece while it is held in contact with the conductor, means for automatically releasing the terminal piece after an interval for cooling, means for automatically returning the carriage to its original position on completion of the cooling interval and automatic means for resetting the machine for a further cycle of operations.

5. A machine for automatically carrying out a cycle of operations involved in the soldering of a terminal piece to a conductor comprising a support for the conductor, a movable carriage carrying means for gripping the terminal piece, means for actuating the means for gripping means for the terminal piece upon insertion of a terminal piece, means for moving the carriage to carry the terminal piece towards the conductor into a position for attachment to the conductor, means for heating the terminal piece, a process timer for controlling the heating period, means for automatically releasing the terminal piece after a period for cooling, means for automatically returning the carriage to its original position on completion of the cooling period, and automatic means for resetting the machine for a further cycle of operations.

6. A machine for automatically carrying out a cycle of operations involved in the soldering of a number of terminal pieces one to each of a number of conductors comprising a common support for the conductors, a movable carriage carrying means for gripping a terminal piece, means for actuating the gripping means for the terminal piece upon the insertion of a terminal piece, means for moving the carriage to carry the terminal piece towards the conductor into a position for attachment to a conductor, means for heating the terminal piece, means for blowing cooling air onto the terminal piece while it is held in contact with the conductor, means for automatically releasing the terminal piece after an interval for cooling, means for automatically returning the carriage to its original position on completion of the cooling interval, automatic means for resetting the machine for a further cycle of operations, means for adjusting the common support for the conductors to bring each of the conductors in a predetermined sequence into the correct position for the attachment of a terminal piece to it, and interlocking means between the means for adjusting the common support and the means for gripping the terminal piece which prevent such gripping taking place until the support has been correctly adjusted.

7. A machine for automatically carrying out a cycle of operations involved in the soldering of a number of terminal pieces one to each of a number of conductors comprising a common support for the conductors, a movable carriage carrying means for gripping a terminal piece, means for actuating the gripping means for the terminal piece being initiated by the insertion of a terminal piece, means for moving the carriage to carry the terminal piece towards the conductor into a position for attachment to a conductor, means for heating the terminal piece, means for blowing cooling air onto the terminal piece while it is held in contact with the conductor, means for automatically releasing the terminal piece after an interval for cooling, means for automatically returning the carriage to its original position on completion of the cooling interval, automatic means for resetting the machine for a further cycle of operations, an indexing plate having a number of holes in it arranged in a pattern similar to the pattern of the conductors in the support, an indexing pin on the support and interlocking means which prevent the gripping of the terminal piece and initiation of a cycle of operations until the indexing pin has been inserted into a predetermined hole in the indexing plate to bring a conductor into a position for the attachment of a terminal piece to it.

8. A machine for automatically carrying out a cycle of operations involved in the soldering of a number of terminal pieces one to each of a number of conductors comprising a common support for the conductors, a movable carriage carrying means for gripping a terminal piece, means for actuating the gripping means for the terminal piece being initiated by the insertion of a terminal piece, means for moving the carriage to carry the terminal piece towards the conductor into a position for attachment to a conductor, means for heating the terminal piece, means for blowing cooling air onto the terminal piece while it is held in contact with the conductor, means for automatically releasing the terminal piece after an interval for cooling, means for automatically returning the carriage to its original position on completion of the cooling interval, automatic means for resetting the machine for a further cycle of operations, an indexing plate having a number of holes in it arranged in a pattern similar to the pattern of the conductors in the support, an indexing pin on the support, interlocking means which prevent the gripping of the terminal piece and initiation of a cycle of operations until the indexing pin has been inserted into a predetermined hole in the indexing plate to bring a conductor into a position for the attachment of a terminal piece to it and an indicator which indicates to the operator into which of the holes in the indexing plate the indexing pin should be inserted.

9. A machine for automatically carrying out a cycle of operations involved in the soldering of a terminal piece to a conductor comprising a support for the terminal piece, a movable carriage carrying means for gripping the terminal piece, means for moving the carriage towards and away from the conductor to carry the terminal piece into a position for attachment to the conductor, means for heating the terminal piece during the movement of the carriage towards the conductor, means controlled by insertion of the terminal piece for actuating the gripping device, means, which can function only after inserting a pin into the gripping means, for initiating the cycle, including a switch for a source of power for the carriage, means for cooling the terminal piece, and control means which, provided that the said source of power remains switched on, automatically control the carrying out of the cycle of operations, including moving the carriage to carry the terminal piece into the soldering position, while heating it, cooling the terminal piece, releasing the terminal piece from the gripping device, moving the carriage away from the terminal piece and resetting the apparatus for a further cycle.

10. A machine for automatically carrying out a cycle of operations involved in the soldering of a terminal piece to a conductor comprising a support for the conductor, a movable carriage carrying means for gripping the terminal piece, means for moving the carriage towards and away from the conductor to carry the terminal piece into a position for attachment to the conductor, means for heating the terminal piece during the movement of the carriage towards the conductor, means controlled by the insertion of the terminal piece for actuating the gripping device, means, which function only after inserting a terminal piece into the gripping means, for initiating the cycle, including a switch for a source of power for the carriage, means for cooling the terminal piece, control means which, provided that the said source of power remains switched on, automatically control the carrying out of the cycle of operations, including moving the carriage to carry the terminal piece into the soldering position, while heating it, cooling the terminal piece, releasing the terminal piece from the gripping device, moving the carriage away from the terminal piece and resetting the apparatus for a further cycle, an adjustable timer for regulating the heating and cooling periods for the terminal piece and interlocking arrangements which prevent the commencement of each new operation in the cycle until the previous operation has been completed.

References Cited in the file of this patent

UNITED STATES PATENTS

| | | |
|---|---|---|
| 1,732,523 | Mayo | Oct. 22, 1929 |
| 1,873,150 | Phelps | Aug. 23, 1932 |
| 2,397,052 | Schietinger | Mar. 19, 1946 |

OTHER REFERENCES

American Machinist, March 29, 1945, pp. 119, 120.